United States Patent Office 3,284,397
Patented Nov. 8, 1966

3,284,397
HYDROCARBON OIL-AQUEOUS ACID RUBBER EMULSION
Nelson G. Johnston, Tulsa, Okla., assignor to The Dow Chemical Company, Midland, Mich., a corporation of Delaware
No Drawing. Filed June 20, 1963, Ser. No. 289,390
4 Claims. (Cl. 260—29.7)

The invention is related to a novel oil-water type emulsion and particularly an oil-aqueous acid-type emulsion which is unusually stable against separation or deterioration when subjected to advanced temperatures.

Emulsions are widely used for many industrial processes. They provide an intimate intermixture of substantially immiscible liquids, e.g. a hydrocarbon oil and an aqueous liquid. By use of such emulsions, simultaneous contact with reactants or surfaces being treated can be made by substantially immiscible liquids. Emulsions offer a number of advantages of a physical nature over either the aqueous liquids or the oil liquid used separately as, for example, for suspending insoluble particulate material therein.

An emulsion to be widely useful must resist being separated into the oil and aqueous phases until it has reacted or otherwise served its purpose; it must not be too viscous to be pumped or otherwise transported to a place of use or while in use; in some instances, it is desirable that the emulsion, after use, separates into its phases and does not emulsify thereafter.

There is a need for an emulsion that is more resistant to advanced temperatures then those now commonly employed. An emulsion, which will remain stable at temperatures in excess of 275° F. and which possesses the other desirable characteristics of an emulsion, is not now readily available.

The invention provides an improved emulsion and a method of preparing such emulsion that possesses the above-mentioned properties.

The invention, accordingly, is an emulsion comprising an aqueous solution and an oil and has improved stability against deterioration by heat, and the method of making such emulsion. The method of making the emulsion consists essentially of preparing a rubber-plasticizer oil composition, as hereinafter described, and thereafter admixing the composition so made with either water or an aqueous solution (including aqueous acidic solutions) and a hydrocarbon oil to be emulsified and mixing the aqueous solution and oil together. It is preferred that the rubber-plasticizer oil composition be admixed with the oil and thereafter the resulting oil containing the emulsifier be admixed with the aqueous solution.

The rubber-plasticizer oil composition is made as follows: a suitable hydrocarbon oil or mixture of hydrocarbon oils (to which reference hereinafter will be made as a plasticizer oil) and a particulate rubber are heated to a temperature between about 400° F. and 550° F. for a period of time of between about 0.5 and 5.0 hours. It is then cooled to a convenient temperature for use, e.g., room temperature.

The plasticizer oil which may be employed in the preparation of the rubber-plasticizer oil composition used in the invention consists of at least 10% by weight, an aromatic hydrocarbon and balance substantially any one of the following: alkyl-substituted benzenes, phenyl-substituted alkanes and mixtures thereof, tri-cresyl phosphate, crude oil, kerosene, naphtha, Diesel oil, gas oil, residium remaining from petroleum oil fractionating and cracking operations, and heat-liquefiable solid hydrocarbons such as Gilsonite and biphenyl. A preferred plasticizer oil to employ is a mixture consisting of Diesel oil admixed with alkyl benzenes and phenyl alkanes. A recommended oil mixture of this type is one consisting of Diesel oil and the residue of still-bottoms (sometimes called polystill-bottoms) remaining after the final distillation or fractionation step in the production of ethylbenzene. Since ethylbenzene is a large production commodity (one of its principal uses being for the production of styrene), the still-bottoms are produced in large quanties as a by-product. Illustrative of such still-bottoms remaining in the production of ethylbenzene is the one having the analysis, in percent by weight, set out below.

| Ingredient: | Percent by weight |
|---|---|
| Triethylbenzene | 2.5 |
| Tetraethylbenzene | 15.0 |
| Pentaethylbenzene | 15.0 |
| Hexaethylbenzene | 5.5 |
| 1,2-diphenylethane | 0.7 |
| 1,1-diphenylethane | 22.0 |
| Ethylated monophenylethanes | 8.0 |
| Ethylated diphenylethanes | 31.0 |
| Undetermined | 0.3 |

Reference hereinafter will be made to the above still-bottoms as S-bottoms.

The aromatic oil required to comprise at least about 10% of the plasticizer oil may be present as an ingredient of crude oil or fractions of such crude oil which naturally contains aromatic oils, commonly known as asphalt-base crudes. It may also be provided by admixing an aromatic oil with aliphatic oils to provide the necessary percent of aromatic oil.

Generally speaking, the rubber employed in the practice of the invention may be either unvulcanized, vulcanized, or reclaimed rubber, and may be either natural rubber or synthetic rubber. Among such natural rubbers are gutta-percha, balata, para-rubber, and rubber from such less important rubber sources as the goldenrod, certain species of the mulberry family, Indian kelp, and parthenium (a variety of which grows on the semi-desert area of Mexico). Among synthetic rubbers useful in the practice of the invention are polymerized isobutylene, 2-chloro-1,3-butadiene, isoprene, 2,3-dimethylbutadiene, alkylene polysulfides; alkyl and dialkylsiloxanes, and copolymers among which are butadiene-styrene (known generally as GR–S or more recently as SBR rubber), isoprene- or butadiene-isobutylene, vinylalkylpyridine-butadiene, butadiene-acrylonitrile, and the more recent polymer known as "synthetic natural" because it has the general properties of natural rubber.

Reclaimed rubber is the product resulting from the treatment of vulcanized scrap rubber to overcome, to some extent, the effects of vulcanization, in other words, to restore at least some of the characteristics which existed prior to vulcanization. Used tires, both casings and inner tubes of both synthetic and natural rubber, comprise a large percent of the raw scrap source of vulcanized rubber used. Methods of reclamining rubber are widely discussed in texts on the subject, e.g., in chapter 17 of Synthetic Rubber by Whitby, published by John Wiley & Sons, New York (1954). Briefly, such methods include the steps of (1) removing metal and the like, e.g., beading from tires, (2) grinding, (3) softening by oil treatment, and (4) either digesting, usually in a hot strong aqueous caustic or sulfuric acid solution, or mechanical working known also as "devulcanization." In mechanical working, heat is generated to raise the rubber temperature to about 400° F. One method of mechanical working employs a two-roll corrugated mill, air-blown separation sieves, and a screw extruder usually having a nozzle at the outlet which is provided with openings of only a few millimeters across. The extruder may be jacketed and be provided with a temperature control medium. British Patents 610,812 and 610,901, issued in 1948 to the U.S. Rubber Reclaiming Company, describe mechanical "devulcanization" processes of this general type.

When unvulcanized rubber is employed in the practice of the invention, it is first cut into relatively small chunks, e.g., about 0.5 inch or less, and dispersed in a suitable solvent, e.g., toluene, and agitated therein until the rubber is dispersed, about one-half hour usually being ample time therefor.

Agitation may be provided by employing any of a number of mixers, e.g., a Waring Blendor. Additional heat is usually not necessary when unvulcanized rubber is used. Heat, however, is produced by the shearing and mixing action during the dispersion of the rubber and the temperature may rise as high as 200° F. The rubber thus dispersed in the solvent is ready for subsequent use in the preparation of the emulsifier as expressed below.

When either unvulcanized or reclaimed vulcanized rubber is employed, a smooth concentrate can be readily prepared by heating the plasticizer oil to the desired temperature and then slowly admixing therewith the rubber with continuous agitation while maintaining the mixture at the required temperature. The composition is preferably prepared by heating the plasticizer oil to between about 450° and 500° F., then admixing all the rubber with a portion of the plasticizer oil, say about one-half thereof, heating the mixture which may be described as heat-dispersing the rubber in the plasticizer oil, for from 1 to 3 additional hours with more-or-less continuous stirring, and then admixing the hot rubber-oil mixture with the balance of the plasticizer oil, and, while continuing to stir, allowing the resulting mixture to cool to a temperature at which it is easily handled, e.g., between about 20° and 50° C., about room temperature usually being employed, to make a substantially homogeneous concentrate.

The particulate rubber employed is preferably of a size such that substantially all passes through a No. 10 mesh sieve (U.S. Standard Sieve Series); a particle size passing through a 20 mesh sieve is recommended. The parts by weight of rubber and plasticizer oil in the concentrate may be between 0.05 and 5.0 parts of rubber to 1 part of the plasticizer oil. However, it is recommended that it be between 0.08 and 3.0 parts of rubber to 1 of the plasticizer oil and preferably between 0.3 and 2.0 parts of the rubber to 1 of the plasticizer oil. Below 0.08 part rubber per part of plasticizer oil, there is sometimes shown a tendency for the rubber solids to settle out of the concentrate upon standing. The amount of rubber, expressed in percent of the rubber-plasticizer oil emulsifier so made, is usually between 20 and 40 percent by weight.

The thus cooled rubber-plasticizer oil is subsequently admixed with either the aqueous liquid or with the oil which are to be emulsified or it may be mixed with the oil and the aqueous liquid which are already mixed together. The preferred way of carrying out the invention is to mix the rubber-plasticizer oil thus prepared, which may be herein referred to as the emulsifier, with the oil to be subsequently emulsified and the thus prepared oil added to the aqueous liquid. The ratio by volume of the emulsifier so made to the resulting emulsion of the oil and aqueous liquid in the practice of the invention is between about 0.1% and about 5.0% by volume of the resulting emulsion. The preferred concentration of the emulsifier by volume of the resulting emulsion is between about 1.0% and 3.0%. The ratio, by volume, of the aqueous liquid to oil employed may be between about 0.1 and 9.0 parts by volume of the aqueous liquid to 1 of the oil. Any convenient mixing apparatus may be employed to prepare the emulsion. The emulsification may be effected at any convenient temperature, room temperature being satisfactory unless a hydrocarbon oil is employed which is solid at such temperature. In such instance, a temperature for emulsification will be necessary which is above the melting point of the hydrocarbon oil.

The following tests were run to show the stability of the emulsion of the invention at advanced temperatures. The emulsifier was prepared as above described. It was thereafter admixed with kerosene, in the percent by volume set out in Table I (based on the total volume of the emulsion), and the emulsifier-kerosene mixture so made admixed with a 15% by weight aqueous solution of HCl in 70:30 volume proportions of kerosene and the HCl solution.

The viscosity, as determined by a Fann viscosimeter, having the spindle set at 100 r.p.m., and the percent of the aqueous acid solution (based on the total volume of the emulsion) which separated into a separate phase (designated "percent breakout") are also shown in Table I.

*Table I*

| Test No. | Percent by Volume Emulsifier | Viscosity in Centipoises | Percent Break-out at 300° F. after— | |
|---|---|---|---|---|
| | | | 15 min. | 3.5 hours |
| 1 | 0.1 | (¹) | Not stable | Not stable.² |
| 2 | 0.25 | 60 | 100 | 100.³ |
| 3 | 0.5 | 118 | None | 20. |
| 4 | 1.0 | 172 | ----do------ | None. |
| 5 | 2.0 | 159 | ----do------ | Do. |
| 6 | 3.0 | 147 | ----do------ | Do. |
| 7 | 5.0 | 165 | ----do------ | Do. |

¹ Not sufficiently stable to measure.
² When only 0.1% of the emulsifier was used, an emulsion formed but separated into phases within about 1 minute.
³ When only 0.25% of the emulsifier was used, an emulsion formed which was stable for about 5 minutes.

It may be observed by reference to Table I that an emulsion forms (although it breaks soon) when only 0.1% by volume of the emulsifier in accordance with the invention is employed; that an emulsion which was stable for 5 minutes formed when only 0.25% by volume of the emulsifier in accordance with the invention was employed; that the emulsion of the invention is stable for 15 minutes when employing only 0.5% and is stable for at least 3.5 hours when employing as little at 1.0% of the emulsifier, based on the volume of the resulting emulsion of aqueous acid and the oil at the advanced temperature of 300° F.

Stability of the emulsion improves with decreases in temperature down to those approaching 0° C. Accordingly, emulsions of the invention are more stable at lower temperatures than those shown in Table I at the advanced temperature of 300° F. at which the above tests were run.

To show that the emulsifier employed in the practice of the invention is especially satisfactory when supplemented by a known emulsifier, a second series of tests was run. 70 parts by volume of either water or an aqueous HCl solution of specified concentration and 28 parts by volume of kerosene were emulsified with 2 parts by volume of the emulsifier in accordance with the invention, supplemented by a known emulsifier (designated Emulsifier E) in the amounts set out in Table II. The percent by weight of HCl in the aqueous HCl solution and the stability of the resulting emulsion at a temperature of 275° F. are also shown in Table II.

Table II

| Test No. | Percent by Weight of HCl in aqueous solution | Percent by Volume of known Emulsifier | Percent by Volume of Emulsifier of the Invention based on Total Volume of Emulsion | Percent Breakout at 275° F. in hrs. | | | |
|---|---|---|---|---|---|---|---|
| | | | | 1 | 2 | 3 | 4 |
| 8 | 15 | None | 2.0 | None | None | None | None. |
| 9 | 7.5 | do | 2.0 | do | 20 | 20 | Test terminated. |
| 10 | 3 | do | 2.0 | do | 25 | 25 | Do. |
| 11 | (1) | do | 2.0 | do | None | None | None. |
| 12 | 15 | 0.05 | 1.95 | do | do | do | Do. |
| 13 | 15 | 0.1 | 1.90 | do | do | do | 1.0. |
| 14 | 15 | 0.25 | 1.75 | do | do | 50 | 60. |

[1] None—fresh water used.

Reference to the examples of Table II, wherein a conventional emulsifier was used to supplement the emulsifier used in accordance with the invention, shows that the rubber-plasticizer oil emulsifier is compatible, and may be used, with a well-known emulsifier.

A further series of tests was run wherein emulsions were prepared according to the practice of the invention employing the rubber-plasticizer oil emulsifier. Various oils and 15% aqueous HCl were emulsified, using 70 parts of the acid, 28 parts of the oil, and 20 parts of the rubber-plasticizer oil by volume according to the invention. The emulsion was prepared in the same manner as those above and were tested as follows:

Table III

| Test No. | Oil Employed | Results |
|---|---|---|
| 16 | Kerosene | Emulsion with no separation. |
| 17 | Diesel fuel | Do. |
| 18 | Crude oil, API gravity of 30.8°. | Do. |
| 19 | Crude oil, API gravity of 19.2°. | Do. |
| 20 | CCl₄ | Do. |
| 21 | Toluene | Do. |

Reference to Table III shows that the emulsions therein shown, which were prepared according to the invention and employing various oils, are clearly satisfactory.

A further series of tests was run employing different aqueous liquids which were emulsified with kerosene as the oil phase. In each of the tests of this series, 70 parts of the aqueous phase were employed with 28 parts of kerosene and 2 parts of emulsifier (prepared according to the invention) by volume. The mixing procedure and the testing procedure were similar to those followed in the above examples.

Table IV

| Test No. | Aqueous Liquid | Results |
|---|---|---|
| 22 | Water | Emulsion formed was stable against separation at 80° F. for at least 1 hour. |
| 23 | 15% HCl | Do. |
| 24 | 15% acetic | Do. |
| 25 | 3% CaCl₂ brine | Do. |
| 26 | 3% NaCl brine | Do. |

Reference to Table IV shows that the emulsion prepared according to the invention, employing different aqueous liquid, is stable against deterioration for satisfactorily long periods.

An additional series of tests was run to show the effect of varying the ratio of an aqueous HCl solution to an oil in the practice of the invention. 15% by weight aqueous HCl solution and kerosene were employed in the ratios by volume set out in Table V below:

Table V

| Test | Percent Emulsifier | Ratio of 15% HCl to kerosene | Break-out after 4 hrs. at 275° F. |
|---|---|---|---|
| 27 | 2 | 60:38 | None. |
| 28 | 2 | 70:28 | Do. |
| 29 | 2 | 80:18 | Do. |

Reference to Table V shows that the emulsion of the invention is highly satisfactory in its resistance to breakout at the advanced temperature of 275° F. when the ratio of the aqueous liquid to the oil liquid in the emusion is varied as shown.

Among the uses of an emulsion are those requiring resistance of the emulsion to passage through a porous confining wall. To show the effectiveness of the emulsion of the invention in its resistance to passage through a porous confining wall, a further series of tests was run. In this series an emulsion was prepared similar to those above, in accordance with the invention, employing a 15% by weight aqueous HCl solution and kerosene in a volume ratio of 70:30. The resistance to passage of the emulsion through a confined wall was ascertained in accordance with standard tests devised by the American Petroleum Institute, designated API RP-39. The results are set out in Table VI below:

Table VI

| Test No. | Percent by volume Emulsifier | Fluid loss at 1,000 p.s.i. and 80° F. at the designated time | | | | |
|---|---|---|---|---|---|---|
| | | 1 min. | 4 min. | 9 min. | 16 min. | 25 min. |
| 30 | 2 | 13 ml | 15.5 ml | 17.5 ml | 18.5 ml | 19.3 ml. |

Reference to Table VI shows that the emulsion of the invention is highly resistant to passage through a porous medium or wall even at the advanced pressure of 1000 p.s.i.

A further series of tests was run to demonstrate the property of the emulsion of the an aqueous-acid oil invention to separate and remain separated into its phases when the acid portion thereof has spent itself, i.e., has reacted with a material reactive therewith. To demonstrate this, two emulsions were prepared in accordance with the invention, employing a ratio of 15% aqueous HCl to oil of 70:30 by volume and emulsified by 2% by volume of the rubber-plasticizer oil emulsifier prepared according to the invention (as described above). The emulsion so made was added to CaCO₃ rock in a vessel and allowed to react therewith for 16 hours at 275° F. After the reaction period the reaction mixture separated into distinct phases. It was then shaken vigorously and the results observed. The spent acid and the oil were shown to have completely separated into, and to remain in, distinct phases. Thus remaining in distinct phases after the acid has spent is highly desirable in instances where the spent emulsion is to be pumped or transported.

Having described my invention what I claim and desire to protect by Letters Patent is:

1. The method of preparing an emulsion of rubber in a hydrocarbon oil and an aqueous liquid selected from the class consisting of water and aqueous acid and salt solutions, which is highly resistant to deterioration by the action of heat, consisting essentially of: heating a mixture of between 0.3 and 2.0 parts by weight of rubber, which has been particulated to a size which passes through a No. 10 mesh sieve, selected from the class consisting of unvulcanized, vulcanized, and reclaimed natural and synthetic rubber and 1 part by weight of a plasticizer oil selected from the class consisting of alkyl-substituted benzenes, phenyl-substituted alkanes and mixtures thereof, tricresyl phosphate, crude oil, kerosene, naphtha, diesel oil, gas oil, residuum remaining from petroleum oil fractionating and cracking operations, and heat-liquefiable solid hydrocarbons containing at least 10 parts by weight aromatic oil, subjecting the mixture so made to a temperature of between about 400° F. and 500° F. for a sufficient time to make a substantially homogeneous mass of rubber and plasticizer oil, and cooling the homogeneous mass so made to a temperature of between about 68° F. and about 122° F., admixing the thus cooled mass with a liquid to be emulsified selected from the class consisting of (a) a hydrocrabon oil to be subsequently admixed with an aqueous liquid, (b) an aqueous liquid to be subsequently admixed with an oil, and (c) a mixture of a hydrocarbon oil and aqueous liquid in a ratio of between 0.1 and 9.0 of the aqueous solution to 1 of the oil by volume, and then mixing the oil and aqueous liquid to make an emulsion, employing the rubber and plasticizer oil emulsifier in an amount of between about 0.1 and about 5 parts by volume thereof based on the volume of the resulting emulsion.

2. The method according to claim 1 wherein the aqueous liquid employed is a 1 to 37 percent by weight aqueous solution of HCl.

3. An oil and water emulsion of rubber consisting essentially of a hydrocarbon oil and an aqueous liquid selected from the class consisting of water and aqueous acid and salt solutions, in a volume ratio of aqueous liquid to oil of between about 0.1 and 9, and between 0.25 and 5.0 percent, by volume, of the emulsion so made, of an emulsifier consisting of the resulting homogeneous mass prepared by admixing particulated rubber, having a particle size of less than about 10 mesh, selected from the class consisting of unvulcanized, vulcanized, and reclaimed natural rubber and synthetic rubber, and a plasticizer oil selected from the class consisting of alkyl-substituted benzenes, phenyl-substituted alkanes and mixtures thereof, tricresyl phosphate, crude oil, kerosene, naphtha, diesel oil, gas oil, residuum remaining from petroleum oil fractionating and cracking operations, and heat-liquefiable solid hydrocarbons containing at least 10% by weight aromatic oil, in a weight ratio of rubber to plasticizer oil of between about 0.5 and 5, and heating the resulting mixture at between about 400° F. and 550° F. for at least about 0.5 hour.

4. The emulsion of claim 3 wherein the aqueous liquid is a 1 to 37 percent by weight aqueous solution of HCl.

References Cited by the Examiner

UNITED STATES PATENTS

| | | | |
|---|---|---|---|
| 395,987 | 1/1889 | Mitchell | 260—711 |
| 1,321,200 | 11/1929 | Furness | 260—710 |
| 2,415,449 | 2/1947 | Sverdrup et al. | 260—710 |

OTHER REFERENCES

The Chemistry of Petroleum Hydrocarbons, vol. 1, Reinhold Publishing Corp., N.Y., 1954.

MURRAY TILLMAN, *Primary Examiner.*

J. ZIEGLER, *Assistant Examiner.*